(12) United States Patent
Guillez et al.

(10) Patent No.: US 7,128,361 B2
(45) Date of Patent: Oct. 31, 2006

(54) REAR TRUNK LID FOR A CONVERTIBLE VEHICLE WITH FOLDABLE ROOF

(75) Inventors: Jean-Marc Guillez, Cerizay (FR); Paul Queveau, Cerizay (FR); Gérard Queveau, Cerizay (FR)

(73) Assignee: Societe Europeenne de Brevets Automobiles, Paris (FR)

( * ) Notice: Subject to any disclaimer, the term of this patent is extended or adjusted under 35 U.S.C. 154(b) by 8 days.

(21) Appl. No.: 10/500,600

(22) PCT Filed: Jan. 31, 2003

(86) PCT No.: PCT/FR03/00309

§ 371 (c)(1), (2), (4) Date: Feb. 3, 2005

(87) PCT Pub. No.: WO03/064195

PCT Pub. Date: Aug. 7, 2003

(65) Prior Publication Data

US 2005/0139404 A1 Jun. 30, 2005

(30) Foreign Application Priority Data

Feb. 1, 2002 (FR) .................................. 02 01232

(51) Int. Cl.
*B60J 7/20* (2006.01)
(52) U.S. Cl. ............................................. 296/107.08
(58) Field of Classification Search ............ 296/107.08
See application file for complete search history.

(56) References Cited

U.S. PATENT DOCUMENTS

| | | | | |
|---|---|---|---|---|
| 3,596,484 | A | * | 8/1971 | Peters ......................... 70/150 |
| 4,796,932 | A | * | 1/1989 | Tame ......................... 292/112 |
| 5,411,302 | A | * | 5/1995 | Shimada ..................... 292/201 |
| 5,620,226 | A | * | 4/1997 | Sautter, Jr. ............. 296/107.08 |
| 5,655,331 | A | | 8/1997 | Mueller et al. |
| 6,186,577 | B1 | | 2/2001 | Guckel et al. |
| 6,193,300 | B1 | * | 2/2001 | Nakatomi et al. ..... 296/107.08 |

FOREIGN PATENT DOCUMENTS

EP      1 084 886      3/2001

OTHER PUBLICATIONS

International Search Report for PCT/FR03/00309; ISA/EP; Mailed Aug. 8, 2003.

* cited by examiner

*Primary Examiner*—Dennis H. Pedder
(74) *Attorney, Agent, or Firm*—Harness, Dickey & Pierce, PLC

(57) ABSTRACT

In a vehicle, each of the pivot assemblies comprises a base secured to the bodywork of the vehicle, a body which is connected to a rear trunk lid via a hinge-forming member, and locking means for locking the body in a position where it is locked relative to said base. The locking means comprise hook-forming means pivotally mounted on the base and adapted to engage a complementary bearing shape of a first engaging element to bear against said bearing shape and to guide the end of the pivoting movement of the lid into the corresponding locked position.

15 Claims, 4 Drawing Sheets

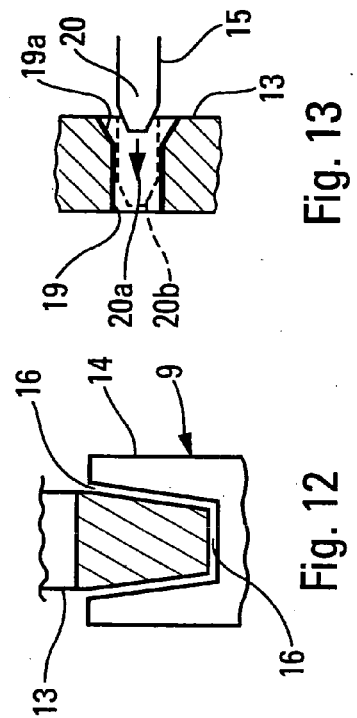
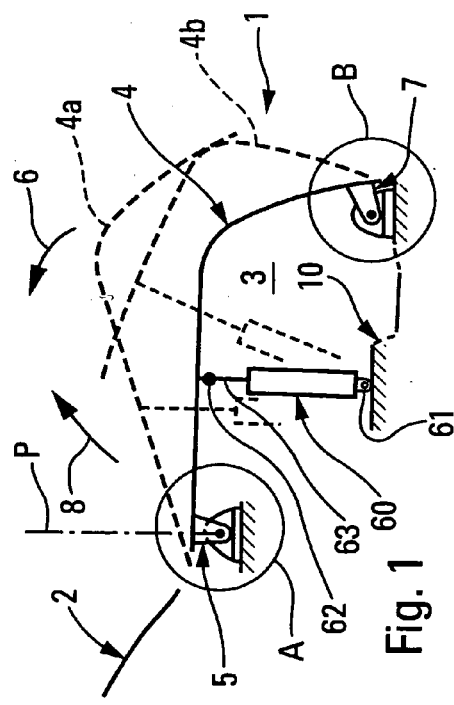
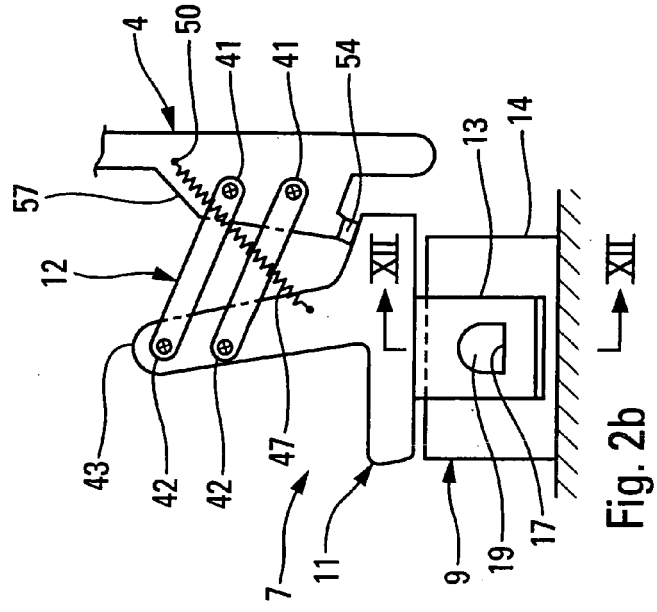
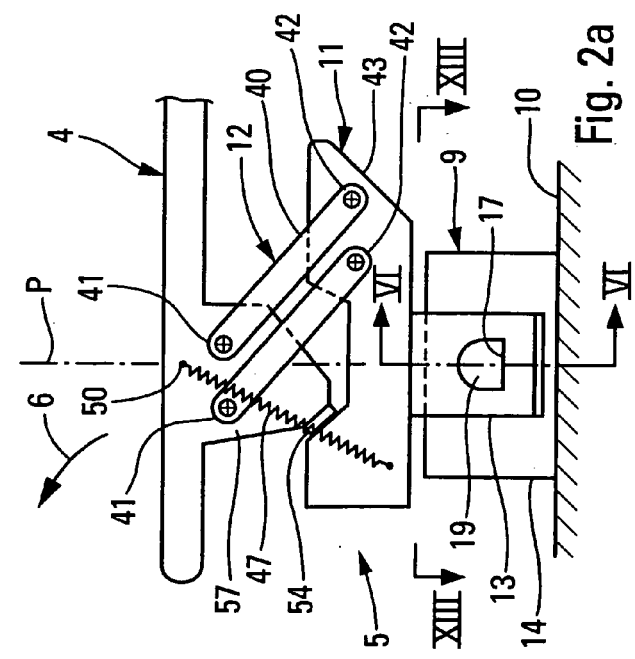

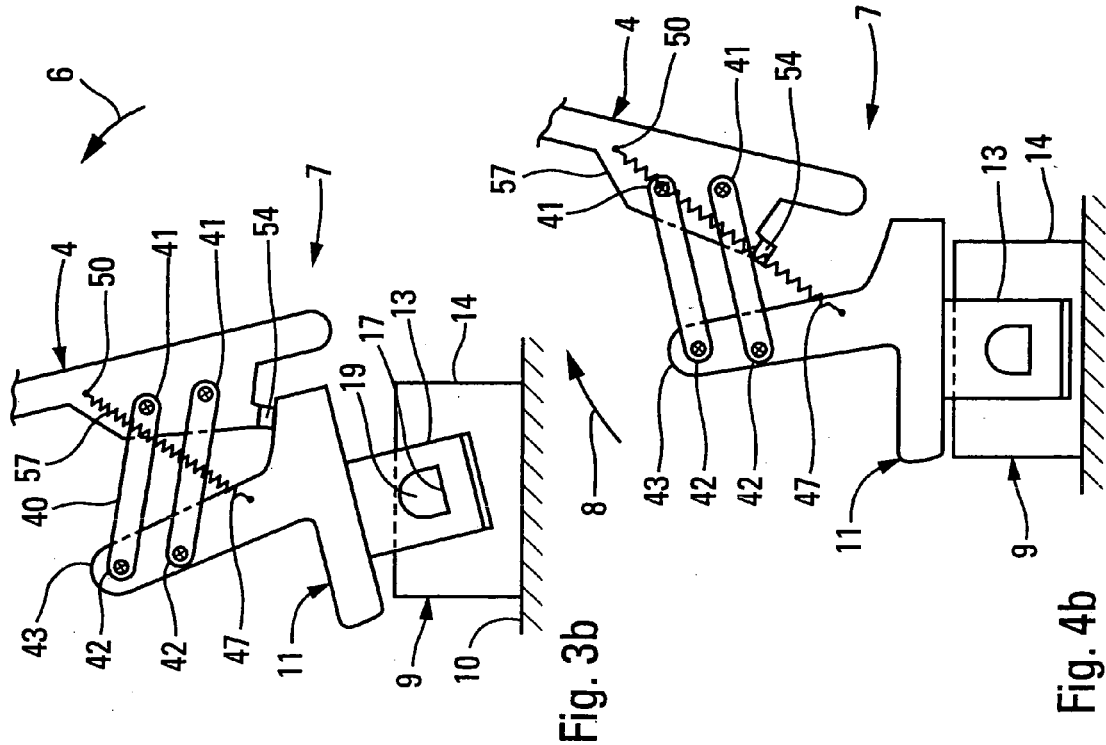
Fig. 3a
Fig. 3b
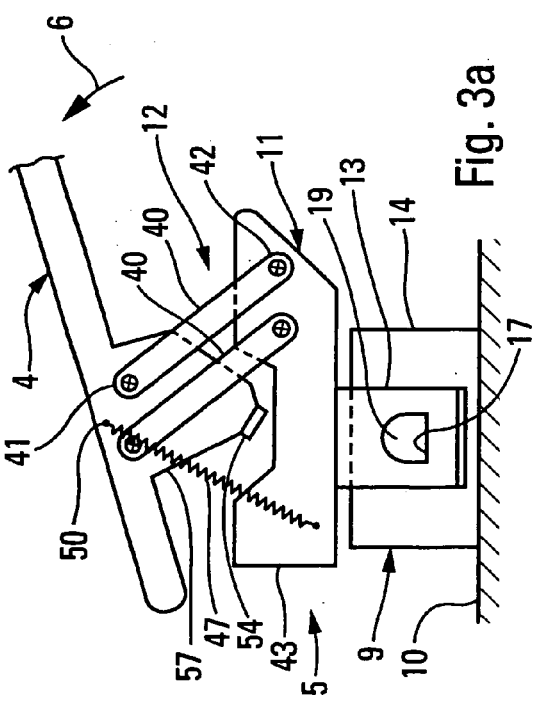
Fig. 4a
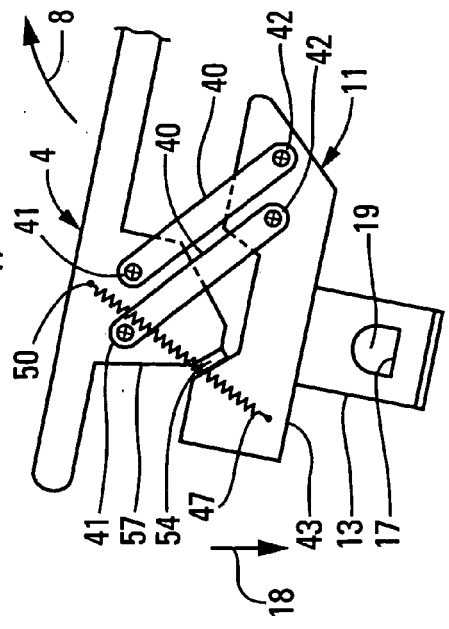
Fig. 4b

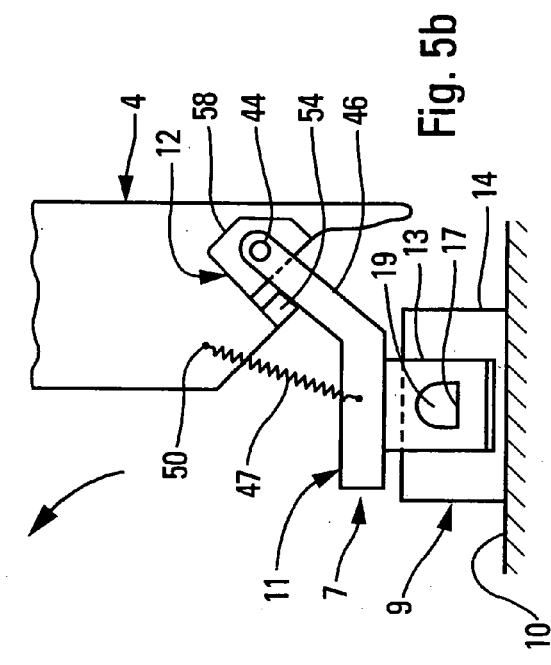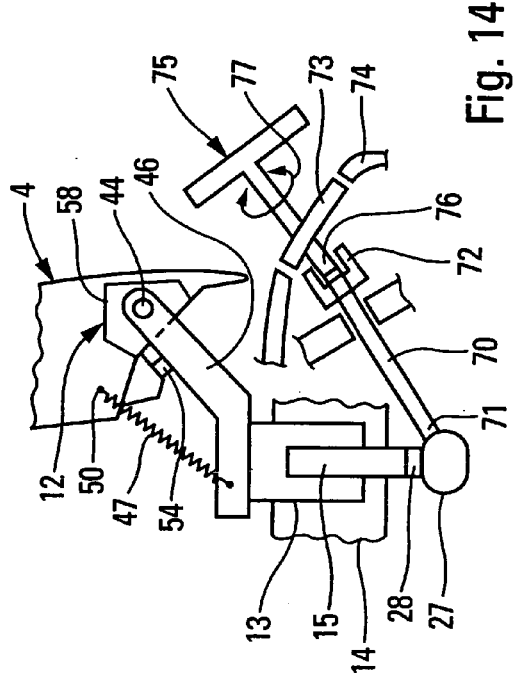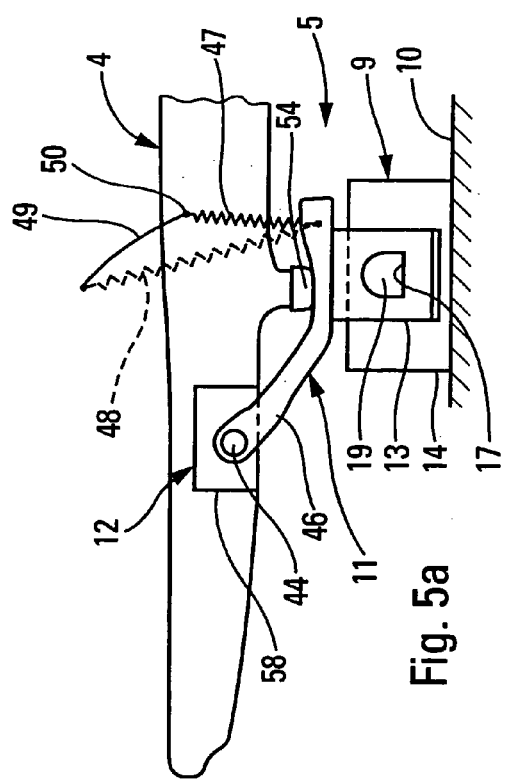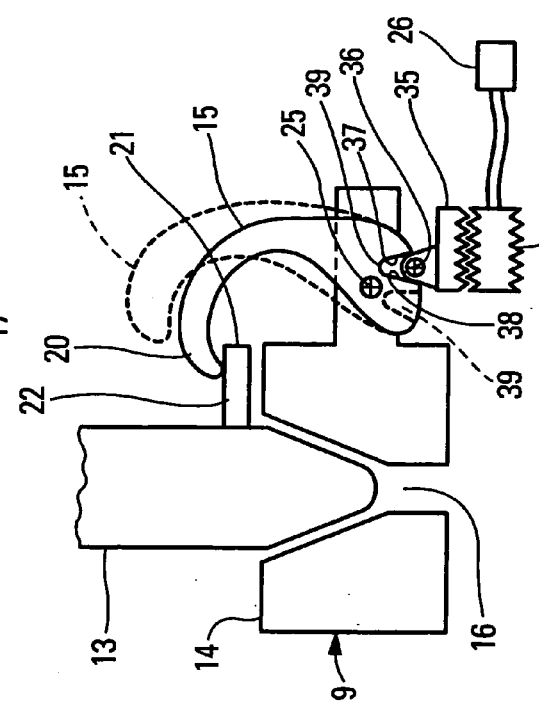

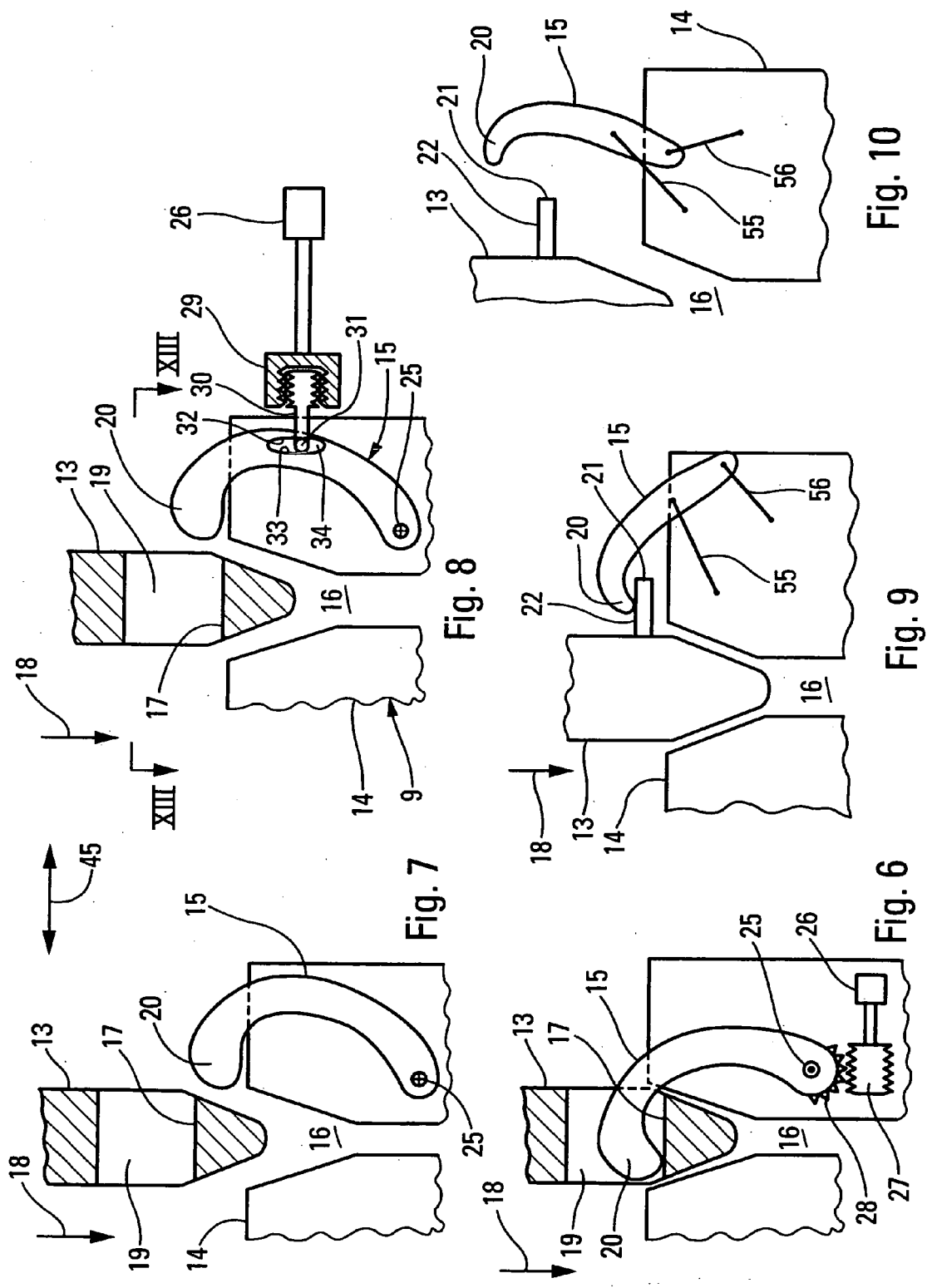

REAR TRUNK LID FOR A CONVERTIBLE VEHICLE WITH FOLDABLE ROOF

The present invention relates to a rear trunk lid for a convertible vehicle with a roof that is foldable into the rear trunk of said vehicle, the lid comprising two front pivot assemblies adapted to cause the lid of the rear trunk to pivot forwards, and two rear pivot assemblies adapted to cause said lid to pivot rearwards.

The present invention also relates to a vehicle including such a rear trunk lid.

French patent FR-B-2 777 241 in the name of the Applicant discloses a lid of the above-specified type in which each pivot assembly is a lock serving either to lock or else to hinge the lid so as to enable it to open either rearwards or forwards.

U.S. patent application US 2001/0048231 A1 discloses another rear trunk lid of the above-specified type.

Each of the pivot assemblies comprises a base fixed to the bodywork of the vehicle, a body fixed to the rear trunk lid by a hinge-forming member and including a first engaging element adapted to be releasably received by a second engaging element of complementary shape forming part of the corresponding base, and locking means for locking the body in its locked position relative to said base.

The locking means described in the second prior art document are constituted by a rod which slides in the transverse direction of the vehicle and which penetrates into a corresponding opening in the body. That requires the opening in the body to be aligned very accurately relative to said rod, and such alignment is not easy to achieve for a vehicle rear trunk lid.

The object of the present invention is to propose a rear trunk lid of the above-specified type that is adapted to guide the rear trunk lid positively at the end of its pivoting movement in order to bring said lid accurately to its locked position.

In the present invention, the rear trunk lid of the above-specified type is characterized in that the locking means comprise hook-forming means pivotally mounted on the base and adapted to engage with a complementary bearing surface of the first engaging element to bear against said bearing surface and guide the end of the pivoting movement of the lid into the corresponding locked position.

Thus, the hook-forming means of the base bear against the bearing surface of the body and positively guide and drive the body and thus the lid into the locked position.

Such a structure is thus well adapted to accommodating all clearances and tolerances, whether due to the conditions that apply when assembling the lid or to deformations of said lid during its various pivoting movements, while also ensuring positive guidance of said lid into the locked position.

Other features and advantages of the present invention appear from the following detailed description.

In the accompanying drawings, given as non-limiting examples:

FIG. 1 is a fragmentary diagrammatic longitudinal section view of a convertible vehicle with a folding roof that includes a rear trunk lid of the prior art;

FIGS. 2a and 2b are enlarged and partially cutaway views of details A and B of FIG. 1, respectively showing a front pivot assembly and a rear pivot assembly for a rear trunk lid in an embodiment of the present invention, said lid being in its closed position;

FIGS. 3a and 3b are views similar to FIGS. 2a and 2b respectively, the lid being shown in a position in which it is pivoted forwards a little;

FIGS. 4a and 4b are views similar to FIGS. 2a and 2b respectively, the lid being shown in a position in which it is pivoted rearwards a little;

FIGS. 5a and 5b are views similar to FIGS. 2a and 2b respectively showing another embodiment of the present invention;

FIG. 6 is an enlarged view in section on VI—VI of FIG. 2a, the hook being in its locked position;

FIG. 7 is a view similar to FIG. 6, the hook being in its unlocked position and the lid being substantially in the position shown in FIG. 4a;

FIG. 8 is a view similar to FIG. 7 showing another embodiment of the present invention;

FIG. 9 is a view similar to FIG. 6 showing another embodiment of the present invention;

FIG. 10 is a view similar to FIG. 9, the hook being in its unlocked position;

FIG. 11 is a view similar to FIG. 9, corresponding to another embodiment of the present invention;

FIG. 12 is a diagrammatic view on XII—XII of FIG. 2b;

FIG. 13 is a fragmentary diagrammatic view in section on XIII—XIII of FIG. 8; and FIG. 14 is a view similar to FIG. 5b showing another embodiment of the present invention.

FIG. 1 is a diagram showing a convertible vehicle, referenced 1, whose roof 2 is foldable into the rear trunk 3 of the vehicle 1. Such a folding roof 2 is known.

The lid 4 of the rear trunk 3 has two front pivot assemblies 5 adapted to pivot the lid 4 of the rear trunk 3 in a forward direction, as shown by arrow 6 in FIG. 1, to take up a position referenced 4a to give easy access to the rear trunk, e.g. in order to put baggage therein (not shown).

The lid 4 pivots in conventional manner under drive from at least one actuator 60, in general under drive from two actuators 60 disposed on either side of the rear trunk 3. Each actuator is hinged at the end 61 of its cylinder to the bodywork 10 of the vehicle, and the end 62 of its rod 63 is hinged to the lid 4.

The lid 4 also has two rear pivot assemblies 7 adapted to enable the lid 4 to pivot rearwards in the direction of arrow 8, into a position referenced 4b, so as to enable the lid 4 to be stowed in a folded configuration inside the rear trunk 3.

As shown in detail in FIGS. 2a, 2b, 3a, 3b, 4a, 4b, and 5a, 5b, each of the pivot assemblies 5, 7 comprises a base 9 secured to the bodywork 10 of the vehicle, a body 11 which is connected to the lid 4 of the rear trunk 3 by a hinge-forming member 12 and which comprises a first engaging element 13 adapted to be releasably received by a second engaging element 14 of complementary shape forming part of the corresponding base 9.

Each pivot assembly 5, 7 also comprises locking means for locking the body 11 in its locked position relative to the corresponding base 9.

In the present invention, the locking means comprise hook-forming means 15 pivotally mounted on the base 9 and adapted to engage a complementary bearing surface of the first engaging element 13 in order to bear against said bearing surface and positively guide the end of the pivot movement of the lid 4 into the corresponding locked position.

As shown in particular in FIGS. 6 to 12, the first engaging element 13 is a male element that is substantially wedge-shaped, and the second engaging element 14 is a female element including a cavity 16 that is substantially wedge-shaped and that is adapted to receive the male, first element 13.

The wedge shape of the first and second engaging elements 13 and 14 provides accurate guidance for the end of the pivoting movement of the lid 4 towards its closed and locked position.

The wedge shape of each male, first engaging element 13 and the wedge shape of each female, second engaging element 14 extend in a vertical plane P that itself extends transversely relative to the lid 4, which plane is parallel to the planes of FIGS. 6 and 12 (see FIGS. 1, 2a, and 2b).

In the embodiment shown diagrammatically in FIGS. 6 and 7, the wedge-shaped first engaging element 13 has a wall 17 that is substantially perpendicular to the trajectory (represented by arrow 18) of the first element 13 coming into its position where it is locked in the cavity 16 of the base 9.

In this embodiment, the wall 17 constitutes the bottom of an opening 19 into which the free end 20 of the hook 15 can penetrate.

The hook 15 is shaped and disposed on the base 9 in such a manner that its free end 20 bears against the wall 17 to urge the first engaging element 13 in the direction of arrow 18 towards the locked position of FIG. 6, and to lock said element 13 in said locked position.

In particular, the hook 15 is shaped so as to oppose any attempt at opening the lid 4, insofar as a force directed vertically upwards on the first engaging element 13 does not exert any force on the hook 15 tending to cause the hook 15 to pivot (to the right in FIG. 6) towards its unlocked position as shown in FIG. 7.

Similarly, the hook 15 is shaped and arranged on the base 9 relative to the wall 17 and to the opening 19 in such a manner as to be adapted to engage the wall 17 in a position of the element 13 that is as remote as possible from the locked position of said element 13 as shown in FIG. 6. The hook 15 thus constitutes a drive element controlling the end of the pivoting movement of the lid 4, in co-operation with the actuators 60.

In the embodiment shown diagrammatically in FIGS. 9 and 10, the first engaging element 13 includes a lug 21 projecting transversely towards the hook 15, and the hook 15 is shaped and disposed on the base 9 in such a manner that its free end 20 bears against the lug 21 to urge the first engaging element 13 in the direction of arrow 18 towards its position where it is locked in the corresponding base 9, shown diagrammatically in FIG. 9, and to lock said first engaging element 13 in said locked position.

In this embodiment, the top surface 22 of the lug 21 is substantially horizontal when the lid 4 is in its closed position, which makes the lug 21 particularly simple to provide.

Co-operation between the end 20 of the hook 15 and the top surface 22 of the lug 21 is organized as described above for the wall 17.

In this embodiment, the hook 15 is pivotally mounted to the ends of two pivoting arms 55 and 56 whose other ends are pivotally mounted on the second engaging element 14.

At least one or both of the two arms 55 and 56 could be an actuator of variable length.

This embodiment enables the end 20 of the hook 15 to bear against the wall 17 (or 22) at a distance from the locked position that is greater than is possible with the pivoting hook shown in FIGS. 6 to 8. Relative to the pivot axis 66 of the lower arm 56 on the second engaging element 14, the pivot axis 65 of the hook 15 at the end of said lower arm 56 is situated in FIG. 10 in the unlocked position of the hook 15 in which the arm 56 is in a position close to the vertical, at a level that is higher than its level in FIG. 9 in the locked position of said hook 15 where the arm 56 has a position that is close to the horizontal.

Naturally, the top surface 22 of the lug 21 could be given a shape other than plane and an orientation other than the horizontal orientation of FIG. 9.

In the example of FIG. 13, the shape 19a of the cross-section of the opening 19 is flared towards the hook 15 and of a width that is little greater than that of the hook 15. Thus, when the end 20 of the hook 15 penetrates into the opening 19 (arrow 20a), the flared shape 19a constrains the element 13 to become centered relative to the hook 15 so that the lid 4 is accurately centered when each of the hooks 15 is in its locked position in which its free end 20 occupies the position shown in dashed lines at 20b.

The lid 4 includes means for causing each hook 15 to pivot in one direction or the other about its pivot axis 25 in order to lock or release the first engaging element 13.

These means for pivoting each hook 15 may be any conventional means, and in general comprise a motor shown diagrammatically at 26.

In the embodiment of FIG. 6, the motor 26 drives a wormscrew 27 that meshes with a set of teeth 28 secured to the hook 15 and centered on the pivot axis 25 of the hook 15.

In the embodiment of FIG. 7, the motor (not shown) is adapted to cause the pivot pin 25 of the hook 15 to turn directly. The motor may be mounted directly on the pin 25, or it may cause the pin 25 to turn via a gearbox and/or a cardan joint, or via a flexible cable for transmitting motion.

In the embodiment of FIG. 8, the motor 26 is adapted to drive a stationary pivoting nut 29 which on rotating moves a sliding screw 30 carrying a ball 31 that bears against one wall 32 or the other wall 33 of a slot 34 formed in the hook 15.

In the embodiment of FIGS. 9 and 10, the motor (not shown) is suitable for causing one of the two pivot arms 55, 56 to turn, each of them being hinged at one end to the second engaging element 14 and at its other end to the hook 15.

In the embodiment of FIG. 11, the motor 26 drives a gearwheel 27a meshing with a sliding rack 35 carrying a finger 36 that bears against one wall 37 or the other wall 38 of a notch 39 formed in the hook 15 and opening out in the edge thereof.

In the embodiment shown in FIGS. 2a, 2b, 3a, 3b, 4a, 4b, the hinge-forming member 12 of each pivot assembly 5, 7 comprises two substantially parallel links 40 each hinged at one end 41 to a gusset plate 57 carried by the lid 4 and at its other end 42 to an arm 43 that is secured to the corresponding first engaging element 13.

In the embodiment of FIGS. 5a and 5b, the hinge-forming member 12 of each pivot assembly 5, 7 is a pivot pin 44 extending in the transverse direction 45 of the lid 4 (see FIG. 7) and carried firstly by gusset plates 58 fixed to the lid 4 and secondly by an arm 46 of the body 11 to which the corresponding wedge-shaped male first engaging element 13 is secured.

Each pivot assembly 5, 7 also includes a return spring 47 placed between the lid 4 and the corresponding body 11 and urging the lid 4 into its closed position in FIGS. 2a and 2b or 5a and 5b.

In FIG. 5a, the position the spring 47 occupies when the lid 4 is open forwards is shown in dashed lines under reference 48, and reference 49 designates the path followed by the end 50 of the spring 47 fixed to the lid 4.

Close to each hinge-forming member 12, the lid 4 carries an abutment shown diagrammatically at 54, which abutment may be adjustable, if necessary, and serves to position the male, first engaging element 13 and the corresponding female, second engaging element 14 relative to each other.

Several embodiments are described above of a rear trunk lid that, by the positive action of the hook 15, enables the lid 4 to be guided accurately and reliably without jolting or shock towards its locked position, this guidance being controlled automatically by a motor 26 which drives the hook 15.

In the event of the above-mentioned locking and unlocking means breaking down, which means are located inside the rear trunk 3 of the vehicle, it is necessary to provide means that enable at least the two rear pivot assemblies to be unlocked manually in order to gain access to the inside of the rear trunk 3.

In the embodiment shown diagrammatically in FIG. 14, the hook 15 is shown as being provided with a set of teeth 28 meshing with a wormscrew 27, as shown in FIG. 6.

In this example, the hook 15 can be caused to pivot under direct drive into its unlocked position by means of a shaft 70 whose inside end 71 engages with the teeth 28 via means that are not shown but that are known to the person skilled in the art.

The outside end 72 of the shaft 70 is accessible from outside the vehicle via a removable cap 73 provided in the shield 74.

After removing the cap 73, a tool shown diagrammatically at 75 is inserted, the tool having a free end 76 of a shape that is complementary to the shape of the outside end 72 of the shaft 70.

By way of example, the free end 76 of the tool 75 has a male shape of square section adapted to engage with a complementary female shape of square section at the outside end 72 of the shaft 70.

Thus, by means of a hand tool 75 provided with the vehicle, it is possible to turn the shaft 70 so as to pivot the hook 15 (arrow 77).

In general, when pivoting of the hook 15 is controlled in some other way, it suffices to act appropriately on the gearbox interposed between the motor 26 and the hook 15, in any manner that is known per se.

Naturally, the present invention is not limited to the embodiments described above, and numerous changes and modifications can be made thereto without going beyond the ambit of the invention.

Thus, the wedge shape of the engaging elements 13 and 14 could be replaced by truncated pyramid or truncated cone shapes providing guidance both in a longitudinal plane and in a transverse plane.

It would also be possible to provide the base 9, the hook 15, and the motor 6 on the lid 4 while providing the body 11 on the bodywork 10 of the vehicle.

The invention claimed is:

1. An assembly for pivoting, on a bodywork of a convertible vehicle having front and rear ends and a roof which is foldable into a rear trunk of said vehicle, a lid adapted for selectively covering said rear trunk, the assembly comprising front pivot assemblies adapted to cause the lid to pivot forwards relatively to said bodywork, and rear pivot assemblies adapted to cause said lid to pivot rearwards relatively to said bodywork, each of the pivot assemblies comprising:
a body connected to the lid by a hinge-forming member, said body comprising a first engaging element;
a base adapted to be secured to the bodywork, said base comprising a second, complementary engaging element, said first and second, complementary engaging elements being adapted to be releasably engaged with each other; and
locking means comprising hook-forming means pivotally mounted on the base and adapted for engaging a complementary bearing shape provided on the corresponding first engaging element to bear against said bearing shape and for locking the corresponding body in a locking position in which said body is locked relative to said base, each hook-forming means being shaped and arranged on the corresponding base in such a manner that:
it becomes engaged with said complementary bearing shape of the first engaging element when said first engaging element is in a final approach position that is close to its locking position; and
thus it guides the end of the pivoting movement of the lid into the corresponding locked position.

2. The assembly according to claim 1, wherein:
the first engaging element of the corresponding body comes along a path into its locked position in the corresponding base,
the first engaging element includes a wall extending substantially perpendicularly to said path, and
the corresponding hook-forming mean is shaped and disposed in such a manner that a free end thereof bears against said wall to urge the first engaging element towards its locked position in the corresponding based and lock it therein.

3. The assembly according to claim 1, wherein the first engaging element includes a lug projecting transversely towards the corresponding hook-forming mean, and said corresponding hook-forming mean is shaped and arranged in such a manner that a free end there of bears against said lug to urge said first engaging element towards its locked position in the corresponding base and lock it therein.

4. The assembly according to claim 1, further comprising driving means for causing each hook-forming mean to pivot in order to lock or release the corresponding first engaging element, said driving means comprising a motor adapted to pivot a pivot pin of the corresponding hook-forming mean.

5. The assembly according to claim 1, wherein each first engaging element is a male element that is substantially wedge-shaped, and each second, complementary engaging element is a female element having a cavity that is substantially wedge-shaped and adapted to receive said male, first engaging element.

6. A convertible vehicle having front and rear ends and comprising:
a bodywork including a rear trunk;
a lid pivotally arranged relative to said bodywork for selectively covering said rear trunk in a closing position;
a roof which is foldable into the rear trunk;
front pivot assemblies adapted to cause the lid to pivot forwards relatively to said bodywork;
rear pivot assemblies adapted to cause said lid to pivot rearwards relatively to said bodywork;
each of the front and rear pivot assemblies further comprising:
a body which the lid is pivotally connected to, said body comprising a first engaging element;
a base secured to the bodywork, said base comprising a second, complementary engaging element, said first and second, complementary engaging elements being adapted to be releasably engaged with each other; and locking means comprising hook-forming means pivotally mounted on the base and adapted for engaging a complementary bearing shape provided on the corresponding first engaging element to bear against said bearing shape, and for locking the corresponding body in a locking position in which said body is releasably locked relative to said base, the hook-forming means being shaped and arranged on the corresponding base in such a manner that:

it becomes engaged with said complementary bearing shape of the first engaging element as soon as said first engaging element is in a final approach position that is close to its locking position; and thus it guides the end of the pivoting movement of the lid into the corresponding locked position.

7. The convertible vehicle according to claim 6, wherein:
the first engaging element of the corresponding body comes into its locked position in the corresponding base, along a path,
the first engaging element includes a wall extending substantially perpendicularly to said path, and
the corresponding hook-forming mean is shaped and disposed in such a manner that a free end thereof bears against said wall to urge the first engaging element towards its locked position in the corresponding base and lock it therein.

8. The convertible vehicle according to claim 6, wherein the first engaging element includes a lug projecting transversely towards the corresponding hook-forming mean, and said corresponding hook-forming mean is shaped and arranged in such a manner that a free end thereof bears against said lug to urge said first engaging element towards its locked position in the corresponding base and lock it therein.

9. The convertible vehicle according to claim 6, wherein each first engaging element is a male element that is substantially wedge-shaped, and each second, complementary engaging element is a female element having a cavity that is substantially wedgeshaped and adapted to receive said male first engaging element.

10. The convertible vehicle according to claim 9, wherein the wedge shape of each engaging element extends in a vertical plane extending transversely relative to the lid.

11. A locking device for releasably locking to a bodywork of a vehicle a lid adapted for selectively covering a rear trunk of said vehicle, the locking device comprising:

a hook-forming means pivotally arranged on a base adapted to be secured to the bodywork and to which said lid is to be locked;

a complementary bearing shape shaped on an engaging element of a body on which the lid is pivotally arranged, said hook-forming means being adapted:

for engaging the complementary bearing shape to bear against said bearing shape; and for releasably locking the corresponding body in a locking position relative to the base, while allowing the lid to hinge relative to the body;

and driving means for causing the hook-forming means to pivot, in order to releasably lock said body to the bodywork base.

12. The locking device according to claim 11, wherein the hook-forming means comprises a hook having a free end, said hook being so shaped and so arranged on the base that its free end presses on said complementary bearing shape of the body, for locking said body to the bodywork, in a locking position in which said engaging element said base of said body and said bodywork are engaged one in the other, further to a step comprising urging said body towards said locking position.

13. The locking device of claim 11, wherein the lid is pivotally arranged on the body through a hinge-forming member comprising links hinged on both said lid and said body.

14. The locking device according to claim 11, wherein the hook-forming means, when engaging the bearing shape, is pivotally arranged on the base at a location close to a pivoting arrangement of the lid on the body.

15. The locking device of claim 11, wherein the engaging element of the body comes along a path into its locking position in the base, and said engaging element includes a flat wall extending substantially perpendicularly to said path.

* * * * *